(12) United States Patent
Maehara

(10) Patent No.: US 8,418,570 B2
(45) Date of Patent: Apr. 16, 2013

(54) TORQUE SENSOR

(75) Inventor: Hideo Maehara, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 32 days.

(21) Appl. No.: 12/929,067

(22) Filed: Dec. 28, 2010

(65) Prior Publication Data

US 2011/0167928 A1    Jul. 14, 2011

(30) Foreign Application Priority Data

Jan. 12, 2010 (JP) ................................ 2010-003953

(51) Int. Cl.
*G01L 3/00* (2006.01)
(52) U.S. Cl.
USPC .................................................... 73/862.325
(58) Field of Classification Search .............. 73/862.325
See application file for complete search history.

(56) References Cited

U.S. PATENT DOCUMENTS 7,287,440 B1 * 10/2007 Maehara .................. 73/862.322
7,555,963 B2 * 7/2009 Maehara .................. 73/862.333

FOREIGN PATENT DOCUMENTS

| CN | 101063635 A | 10/2007 |
|---|---|---|
| EP | 1 835 273 A2 | 9/2007 |
| EP | 2 107 355 A2 | 10/2009 |
| EP | 2 270 456 A2 | 1/2011 |
| JP | 2007-240496 A | 9/2007 |
| JP | 2007-292550 A | 11/2007 |

OTHER PUBLICATIONS

Chinese Office Action issued on Dec. 25, 2012.

* cited by examiner

*Primary Examiner* — Lisa Caputo
*Assistant Examiner* — Octavia Davis-Hollington
(74) *Attorney, Agent, or Firm* — Rabin & Berdo, P.C.

(57) ABSTRACT

A torque sensor detects a torque acting on a torsion bar provided between a first shaft and a second shaft on the basis of a magnetic flux density led to a rotating magnetic circuit portion from a magnetism generating portion. The magnetism generating portion includes a back yoke and a ring magnet. The back yoke includes a fitting portion fitted onto the first shaft, a joint portion to which the ring magnet is joined, and a stress reduction cutout that suppresses a transmission of a deformation stress generated in a radial direction of the fitting portion to the joint portion.

4 Claims, 8 Drawing Sheets

TORQUE SENSOR

FIELD OF THE INVENTION

This invention relates to a torque sensor for detecting a torque acting on a torsion bar in accordance with a magnetic flux density led from a magnet.

BACKGROUND OF THE INVENTION

Conventionally, a non-contact type torque sensor that detects a steering torque acting on a steering shaft via a magnetic force is used as a torque sensor disposed in a steering device of a vehicle.

Torque sensors disclosed in JP2007-240496A and JP2007-292550A, published by the Japan Patent Office in 2007, both comprise a torsion bar accommodated in a housing to be capable of rotating, an input shaft and an output shaft coupled to respective ends of the torsion bar, a magnetism generating portion constituted by a multipolar magnet fixed to the input shaft, a rotating magnetic circuit portion constituted by a multipolar yoke fixed to the output shaft, a fixed magnetic circuit portion fixed to the housing, and a magnetic sensor that detects a magnetic flux density led to the fixed magnetic circuit portion. The magnetism generating portion is constituted by a back yoke formed from a yoke fixed to the input shaft and a ring magnet formed from a multipolar magnet fixed to the back yoke via an adhesive.

When a torque acts on the torsion bar such that the torsion bar undergoes torsional deformation, relative positions of the magnetism generating portion and the rotating magnetic circuit portion in a rotation direction vary. In accordance with the torsional deformation, the magnetic flux density that is led to the fixed magnetic circuit portion from the magnetism generating portion via the rotating magnetic circuit portion varies. The magnetic sensor outputs a signal corresponding to the magnetic flux density. The torque acting on the torsion bar is detected on the basis of the signal output from the magnetic sensor.

SUMMARY OF THE INVENTION

However, in the torque sensor according to the prior art, when the adhesive peels away such that the ring magnet constituting the magnetism generating portion falls off the back yoke, a position of the ring magnet to the back yoke shifts in an input shaft rotation direction, leading to an error in the output of the torque sensor.

It is therefore an object of this invention to provide a torque sensor capable of preventing a position in which a ring magnet is fixed to a back yoke from shifting in an input shaft rotation direction.

To achieve this object, this invention provides a torque sensor comprising a torsion bar that transmits a torque between a first shaft and a second shaft disposed coaxially, a magnetism generating portion fixed to the first shaft, and a rotating magnetic circuit portion fixed to the second shaft. The torque sensor detects a torque acting on the torsion bar on the basis of a magnetic flux density led to the rotating magnetic circuit portion from the magnetism generating portion. The magnetism generating portion comprises a back yoke which is fitted onto the first shaft and a ring magnet which is joined to an end surface of the back yoke and the back yoke comprises a fitting portion which is fitted onto the first shaft, a joint portion to which the ring magnet is joined; and a stress reduction cutout that suppresses a transmission of a deformation stress generated in a radial direction of the fitting portion to the joint portion.

The details as well as other features and advantages of this invention are set forth in the remainder of the specification and are shown in the accompanying drawings.

DESCRIPTION OF THE PREFERRED EMBODIMENTS

Figure 1:
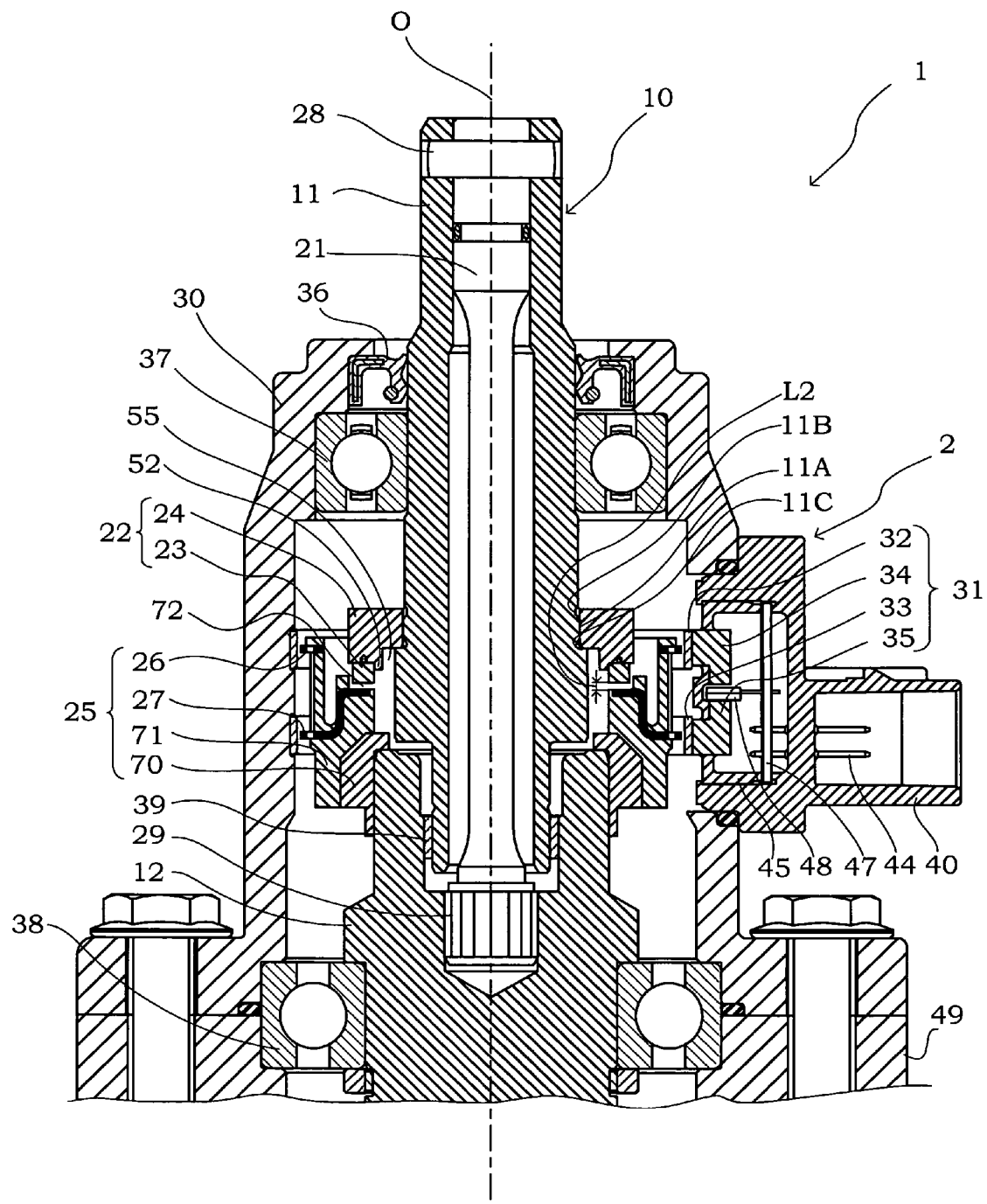
FIG. 1 is a longitudinal sectional view of a power steering device according to a first embodiment of this invention.

Referring to FIG. 1, a power steering device 1 installed in an engine room of a vehicle to which this invention is applied will be described.

In the power steering device 1, a steering shaft 10 and an output shaft 12 rotate in accordance with a rotation of a steering wheel. The power steering device 1 steers vehicle wheels by moving a rack shaft that is meshed to a pinion provided on a lower end of the output shaft 12 in an axial direction.

Further, the power steering device 1 comprises, as an assist mechanism for supplementing a steering torque, a worm wheel coupled to the output shaft 12, a worm meshed to the worm wheel, and an electric motor that drives the worm to rotate. Using the electric motor, the power steering device 1 applies an auxiliary steering torque to the output shaft 12.

The steering shaft 10 is constituted by an input shaft 11 serving as a first shaft and a torsion bar 21. The input shaft 11 is supported rotatably in a housing 30 via a roller bearing 37. The output shaft 12, which serves as a second shaft, is supported rotatably in a housing 49 via a roller bearing 38. A slide bearing 39 is interposed between a lower end portion of the input shaft 11 and an upper end portion of the output shaft 12. The input shaft 11 and the output shaft 12 are supported coaxially to be capable of relative rotation.

The housing 30 and the input shaft 11 are sealed from each other by a dust seal 36. The input shaft 11 is formed in a cylindrical shape. The torsion bar 21 is accommodated coaxially in the interior of the input shaft 11.

An upper end portion of the torsion bar 21 is coupled to an upper end portion of the input shaft 11 via a pin 28. A lower end portion of the torsion bar 21 projects below the lower end portion of the input shaft 11 and is coupled to the upper end portion of the output shaft 12 via a serration 29 of the torsion bar 21. The torsion bar 21 transmits a steering torque input into the input shaft 11 via the steering wheel to the output shaft 12 and undergoes torsional deformation about a rotary axis O in accordance with the steering torque.

The steering device 1 is provided with a non-contact type torque sensor 2 that detects the steering torque acting on the torsion bar 21.

The torque sensor 2 comprises a magnetism generating portion 22 that rotates together with the input shaft 11, a rotating magnetic circuit portion 25 that rotates together with the output shaft 12, a fixed magnetic circuit portion 31 that is fixed to the housing 30, and a magnetic sensor 48 that detects a magnetic flux density led to the fixed magnetic circuit portion 31. The torque sensor 2 detects the steering torque acting on the torsion bar 21 on the basis of an output from the magnetic sensor 48.

It should be noted that the torque sensor 2 may be constructed such that the magnetism generating portion 22 is provided on the output shaft 12 and the rotating magnetic circuit portion 25 is provided on the input shaft 11.

Figure 2A:
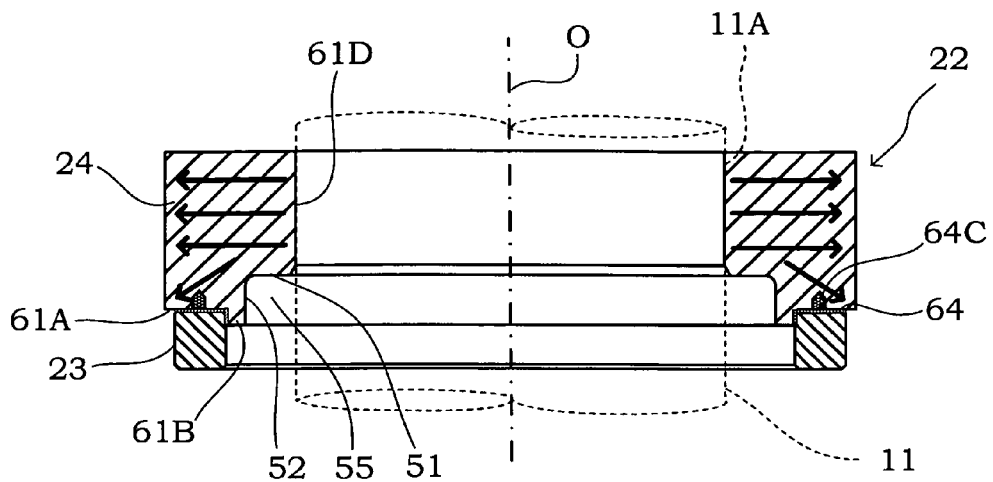
FIGS. 2A and 2B are a longitudinal sectional view and a lower surface view of a magnetism generating portion according to the first embodiment of this invention.
Figure 2B:
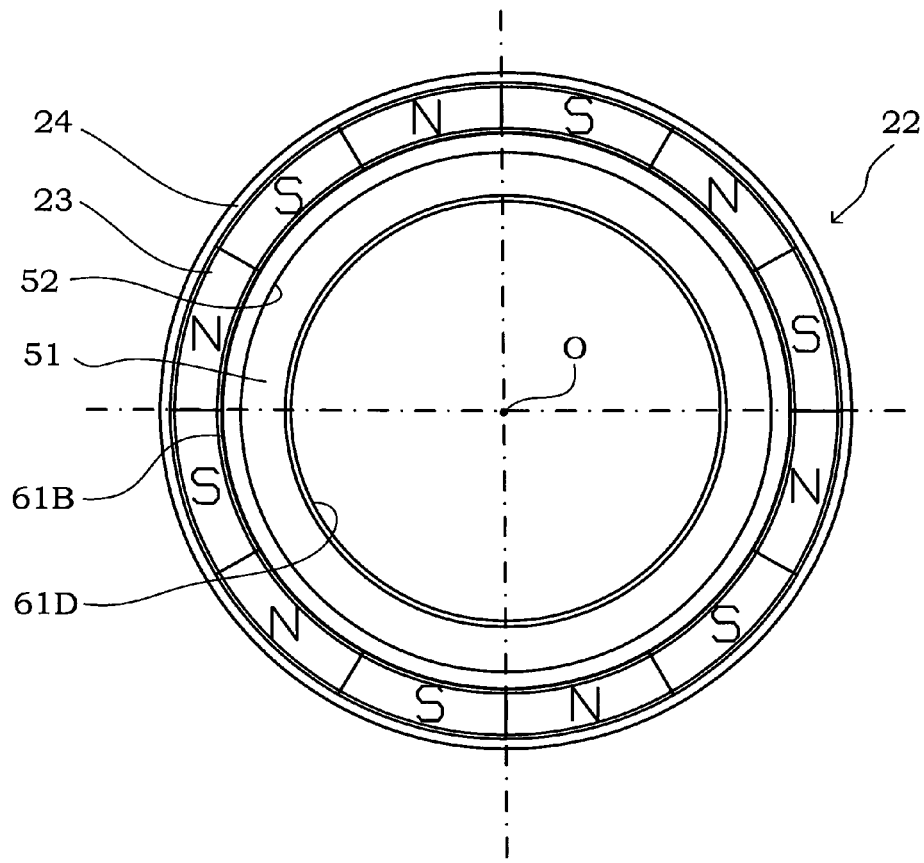

Referring to FIGS. 1, 2A and 2B, the magnetism generating portion 22 comprises a back yoke 24 fitted externally onto the input shaft 11 and a ring magnet 23 fixed to a lower end surface of the back yoke 24.

Figure 5A:
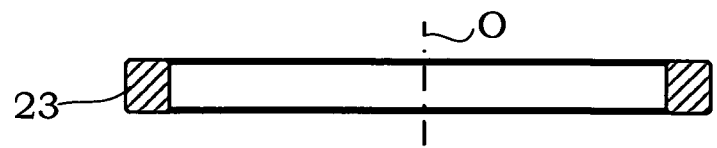
FIGS. 5A and 5B are a longitudinal sectional view and a lower surface view of a ring magnet constituting the magnetism generating portion.
Figure 5B:
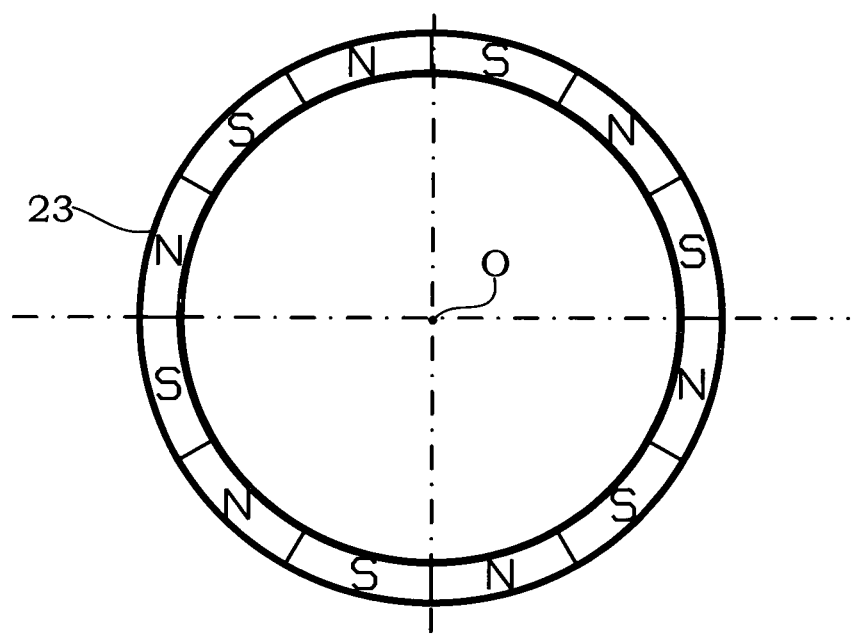

Referring to FIGS. 2B, 5A and 5B, the ring magnet 23 is a ring-shaped permanent magnet that generates magnetism in a direction of the rotary axis O of the input shaft 11 and the torsion bar 21. The ring magnet 23 is a multipolar magnet formed by polarizing a hard magnetic material toward the rotary axis O direction of the input shaft 11.

Twelve magnetic poles are formed at equal intervals in a circumferential direction on each of an upper end surface and a lower end surface of the ring magnet 23. Six N poles and six S poles are disposed alternately on the upper end surface and lower end surface of the ring magnet 23.

Figure 4A:
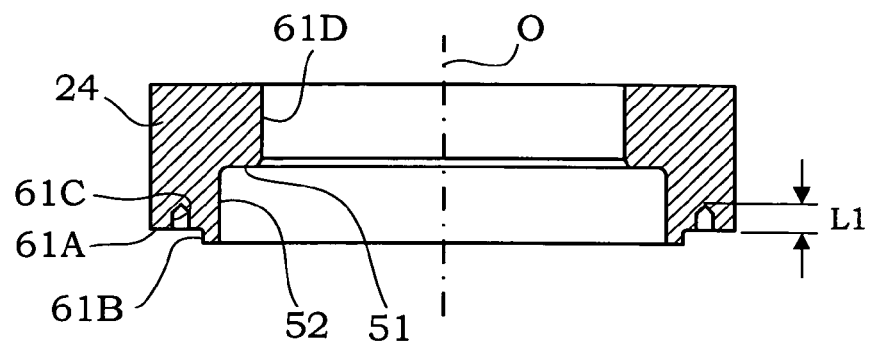
FIGS. 4A and 4B are a longitudinal sectional view and a lower surface view of a back yoke constituting the magnetism generating portion.
Figure 4B:
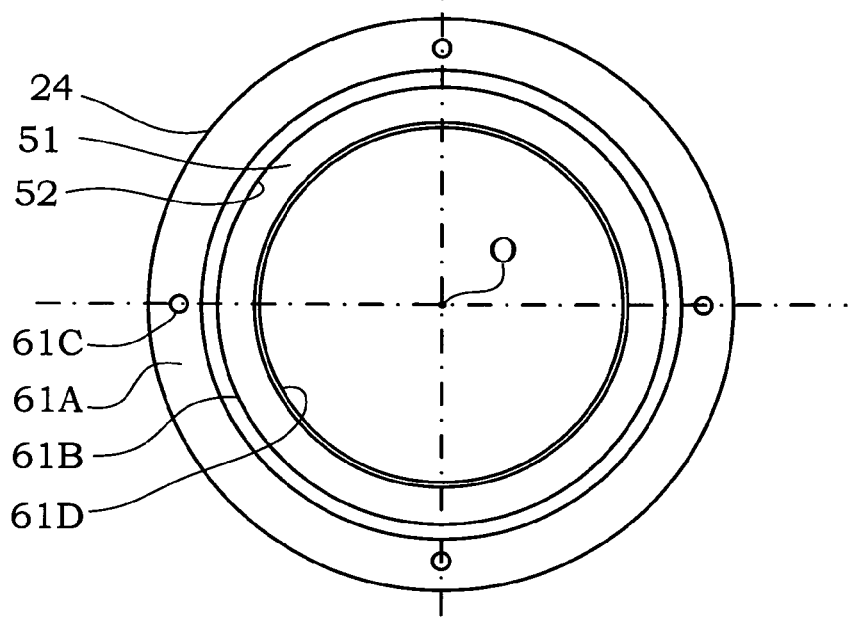

Referring to FIGS. 2A, 4A and 4B, the back yoke 24 is formed in a cylindrical shape from a soft magnetic material. The back yoke 24 contacts the upper end surface of the ring magnet 23, which serves as an upper pole face. The back yoke 24 acts as both a support member for coupling the ring magnet 23 to the input shaft 11 and a yoke for connecting adjacent magnetic poles of the ring magnet 23 and guiding magnetic flux. Hence, the back yoke 24 causes a magnetic force to gather on the lower end surface of the ring magnet 23, which serves as a lower pole face.

Figure 3:
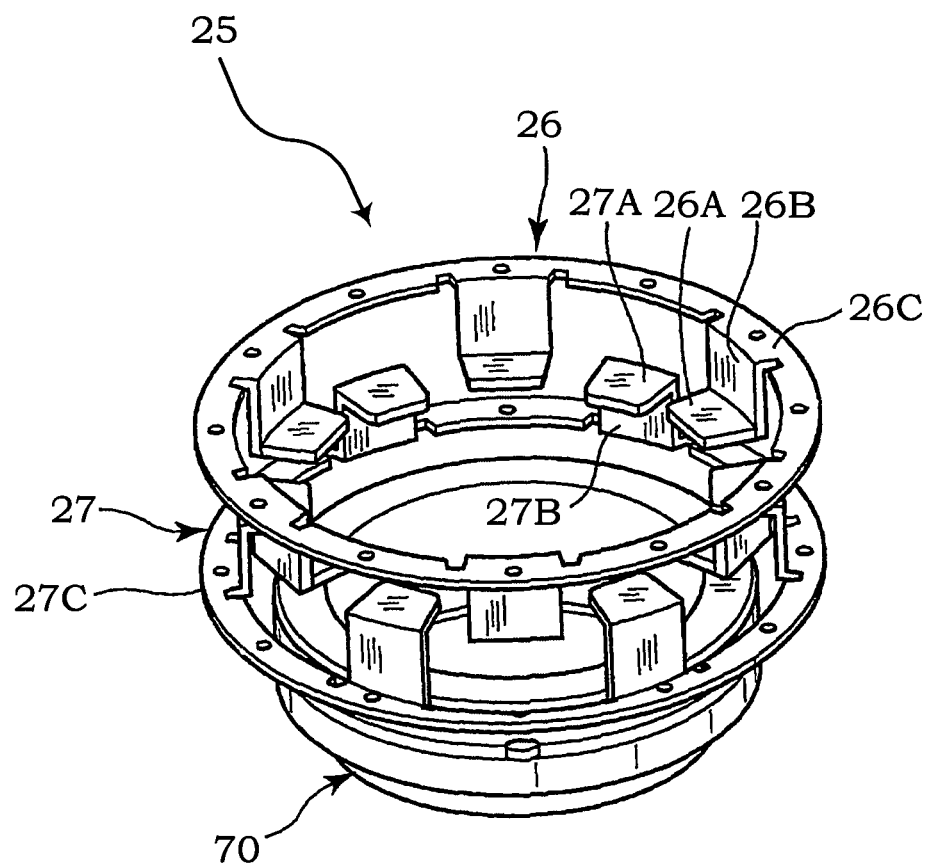
FIG. 3 is a perspective view of a rotating magnetic circuit portion according to the first embodiment of this invention.

Referring to FIGS. 1 and 3, the rotating magnetic circuit portion 25 comprises a first soft magnetic ring 26 and a second soft magnetic ring 27 for guiding the magnetic flux emitted from the ring magnet 23 of the magnetism generating portion 22, an attachment member 70 attached to the output shaft 12, and a resin mold 71 that fixes the first soft magnetic ring 26 and the second soft magnetic ring 27 to the attachment member 70.

The first soft magnetic ring 26 is provided with a first magnetic path ring portion 26C, six first magnetic path column portions 26B projecting downward from the first magnetic path ring portion 26C, and a first magnetic path tip end portion 26A bent inward from a lower end of each first magnetic path column portion 26B so as to face the lower end surface of the ring magnet 23. The second soft magnetic ring 27 is provided with a second magnetic path ring portion 27C, six second magnetic path column portions 27B projecting upward from the second magnetic path ring portion 27C, and a second magnetic path tip end portion 27A bent inward from an upper end of each second magnetic path column portion 27B so as to face the lower end surface of the ring magnet 23.

The first soft magnetic ring 26 and the second soft magnetic ring 27 are respectively formed by pressing. It should be noted that the first soft magnetic ring 26 and the second soft magnetic ring 27 may be formed by casting or sintering instead of being formed by pressing.

The first magnetic path ring portion 26C and the second magnetic path ring portion 27C are disposed at a gap in the axial direction such that the first magnetic path tip end portions 26A and the second magnetic path tip end portions 27A are arranged alternately at equal angular intervals on an identical horizontal plane orthogonal to the rotary axis O of the torsion bar 21.

The first magnetic path tip end portions 26A and the second magnetic path tip end portions 27A are respectively formed in a flat plate shape. The first magnetic path tip end portion 26A is disposed such that in a neutral state where no torque acts on the torsion bar 21, a center line thereof extending in a radial direction of the torsion bar 21 is set to boundary between the N pole and S pole of the ring magnet 23. The second magnetic path tip end portions 27A is disposed such that in the neutral state, a center line thereof extending in a radial direction of the torsion bar 21 is set to boundary between the N pole and S pole of the ring magnet 23.

The first and second magnetic path column portions 26B, 27B are respectively formed in a flat plate shape so as to extend in the rotary axis O direction of the torsion bar 21. The first magnetic path column portions 26B are disposed to surround an outer peripheral surface of the ring magnet 23 via a predetermined gap. The first magnetic path column portions 26B are disposed such that the magnetic flux of the ring magnet 23 does not short-circuit. The second magnetic path column portions 27B extend in an opposite direction to the first magnetic path column portions 26B along the rotary axis O.

By having the first magnetic path column portions 26B and the second magnetic path column portions 27B extend in separating directions in this manner, the first magnetic path ring portion 26C and the second magnetic path ring portion 27C are sufficiently removed from each other in the rotary axis O direction of the torsion bar 21, and therefore a magnetic short-circuit between the two can be avoided.

The first magnetic path ring portion 26C and the second magnetic path ring portion 27C are respectively disposed on an orthogonal plane to the rotary axis O. The first magnetic path ring portion 26C and the second magnetic path ring portion 27C are formed as rings that are connected over their respective entire circumferences. The first magnetic path ring portion 26C and the second magnetic path ring portion 27C are not limited to this shape and may be formed in a C shape in which a slit is provided in one location of the ring shape.

The first magnetic path ring portion 26C is disposed above the lower end surface of the ring magnet 23 and the second magnetic path ring portion 27C is disposed below the ring magnet 23. In other words, the ring magnet 23 is disposed between the first magnetic path ring portion 26C and the second magnetic path ring portion 27C in relation to the rotary axis O direction of the torsion bar 21.

Referring to FIG. 1, the fixed magnetic circuit portion 31 is provided with a first magnetism collecting ring 32 provided along an outer periphery of the first magnetic path ring portion 26C of the first soft magnetic ring 26, a second magnetism collecting ring 33 provided along an outer periphery of the second magnetic path ring portion 27C of the second soft magnetic ring 27, a first magnetism collecting yoke 34 connected to the first magnetism collecting ring 32, and a second magnetism collecting yoke 35 connected to the second magnetism collecting ring 33. The first magnetism collecting yoke 34 and the second magnetism collecting yoke 35 are formed in a block shape.

The first magnetism collecting ring 32 and the second magnetism collecting ring 33 are caulked fixedly to an inner peripheral wall of the housing 30. An inner peripheral surface of the first magnetism collecting ring 32 is set to face to the first magnetic path ring portion 26C of the first soft magnetic ring 26. An inner peripheral surface of the second magnetism collecting ring 33 is set to face to the second magnetic path ring portion 27C of the second soft magnetic ring 27.

The first magnetism collecting yoke 34 is provided to contact an outer periphery of the first magnetism collecting ring 32 and the second magnetism collecting yoke 35 is provided to contact an outer periphery of the second magnetism collecting ring 33. A magnetic gap constituted by a pair of voids arranged in the circumferential direction is formed between the first magnetism collecting yoke 34 and the second magnetism collecting yoke 34. The magnetic sensor 48 is disposed in the magnetic gap.

The first magnetism collecting yoke 34, the second magnetism collecting yoke 35, the magnetic sensor 48, and a substrate 47 are fixed to a sensor holder 40 via a resin mold 45. The resin sensor holder 40 is attached to the metal housing 30 via bolts.

A Hall element is used in the magnetic sensor 48 for detecting magnetism. The Hall element outputs a voltage corresponding to a magnetic flux density passing there-through. The magnetic sensor 48 outputs a voltage corresponding to a magnitude and a direction of a magnetic field in the magnetic gap via the substrate 47 and a terminal 44. It should be noted that a circuit for amplifying the signal output by the Hall element, a temperature compensating circuit, a noise filter circuit, and so on may also be used in the magnetic sensor 48.

The terminal 44 of the magnetic sensor 48 is connected to a controller via a wire connected to the sensor holder 40.

Next, a function of the torque sensor 2 for detecting the steering torque acting on the torsion bar 21 will be described.

In the neutral state where no torque acts on the torsion bar 21, the first magnetic path tip end portion 26A of the first soft magnetic ring 26 and the second magnetic path tip end portion 27A of the second soft magnetic ring 27 respectively face the N pole and the S pole of the ring magnet 23 by an identical surface area. At this time, the N pole and the S pole are magnetically short-circuited, and therefore magnetic flux is not led to the rotating magnetic circuit portion 25 and the fixed magnetic circuit portion 31.

When a driver operates the steering wheel such that a torque is exerted on the torsion bar 21 in a specific direction, the torsion bar 21 undergoes torsional deformation in accordance with the direction of the torque. When the torsion bar 21 torsionally deforms, the first magnetic path tip end portions 26A face the S poles by a larger surface area than the N poles, and the second magnetic path tip end portions 27A face the N poles by a larger surface area than the S poles. Magnetic flux from the ring magnet 23 is led to the rotating magnetic circuit portion 25 and the fixed magnetic circuit portion 31, and the magnetic sensor 48 outputs a signal corresponding to the magnitude and the direction of the magnetic field. A magnetic path through the rotating magnetic circuit portion 25 and the fixed magnetic circuit portion 31 along which the magnetic flux is led extends from the N pole to the S pole via the first soft magnetic ring 26, the first magnetism collecting ring 32, the first magnetism collecting yoke 34, the magnetic sensor 48, the second magnetism collecting yoke 35, the second magnetism collecting ring 33, and the second soft magnetic ring 27.

When the driver operates the steering wheel such that a torque is exerted on the torsion bar 21 in an opposite direction to the above direction, on the other hand, the torsion bar 21 undergoes torsional deformation in an opposite direction in accordance with the direction of the torque. When the torsion bar 21 torsionally deforms, the first magnetic path tip end portions 26A face the N poles by a larger surface area than the S poles, and the second magnetic path tip end portions 27A face the S poles by a larger surface area than the N poles. As a result, the magnetic flux from the ring magnet 23 is led along an opposite magnetic path to the magnetic path described above, and the magnetic sensor 48 outputs a signal corresponding to the magnitude and the direction of the magnetic field. The magnetic path through the rotating magnetic circuit portion 25 and the fixed magnetic circuit portion 31 along which the magnetic flux is led extends from the N pole to the S pole via the second soft magnetic ring 27, the second magnetism collecting ring 33, the second magnetic collecting yoke 35, the magnetic sensor 48, the first magnetism collecting yoke 34, the first magnetism collecting ring 32, and the first soft magnetic ring 26.

The torsion bar 21 undergoes torsional deformation in accordance with the input torque. As a surface area difference by which the first magnetic path tip end portion 26A faces the N pole and S pole of the ring magnet 23 and a surface area difference by which the second magnetic path tip end portion 27A faces the N pole and S pole of the ring magnet 23 increase, the magnetic field of the magnetic gap intensifies, and therefore the signal output by the magnetic sensor 48 increases.

The number of magnetic poles formed on the end surfaces of the ring magnet 23 is set arbitrarily. When the first soft magnetic ring 26 and the second soft magnetic ring 27 oppose the ring magnet 23 by an identical surface area, the magnetic flux density led to the magnetic sensor 48 can be increased by increasing the number of magnetic poles of the ring magnet 23.

Referring to FIGS. 2A and 2B, the ring magnet 23 is formed from sintered metal, for example. The ring magnet 23 is formed in an annular shape. The ring magnet 23 is fixed to the lower end surface of the back yoke 24 via an adhesive 64.

The adhesive 64 is applied in liquid form between the back yoke 24 and the ring magnet 23. Following application, the adhesive 64 is hardened such that the back yoke 24 and the ring magnet 23 are joined.

The back yoke 24 includes a fitting portion 61D fitted to the outer peripheral surface of the input shaft 11. The back yoke 24 is press-fitted to an attachment surface 11A of the input shaft 11 via the fitting portion 61D.

It should be noted that the magnetism generating portion 22 is assembled before being press-fitted to the input shaft 11. When assembling the magnetism generating portion 22, an adhesion process is performed first to adhere the ring magnet 23 to the back yoke 24 using the adhesive 64, whereupon a polarizing process is performed to polarize the ring magnet 23 using the hard magnetic material. The magnetism generating portion 22 assembled in this manner is then attached to the input shaft 11.

To attach the magnetism generating portion 22 to the input shaft 11, first, an axial direction positioning process is performed to press-fit the back yoke 24 lightly to an upper portion of the attachment surface 11A of the input shaft 11 so that the back yoke 24 is capable of sliding. Next, a rotation direction positioning process is performed such that the back yoke 24 in the lightly press-fitted state is set to a rotation direction neutral position of the magnetism generating portion 22 by measuring the magnetic flux density of the magnetism led to the rotating magnetic circuit portion 25. Finally, a fixing process is performed such that the back yoke 24 disposed in the rotation direction neutral position is press-fitted firmly onto the attachment surface 11A of the input shaft 11. As a result, the rotation direction neutral position of the magnetism generating portion 22 can be obtained accurately and the back yoke 24 can be fitted externally onto the input shaft 11.

Incidentally, when the back yoke 24 is press-fitted to the input shaft 11, the fitting portion 61D of the back yoke 24 deforms so as to spread out in the radial direction of the input shaft 11. As a result of this deformation, shearing stress is generated on an adhesion interface between the back yoke 24 and the ring magnet 23, thereby advancing deterioration of the adhesive 64 that fixes the ring magnet 23.

In the torque sensor 2, the back yoke 24 is constructed such that shearing stress according to the deformation of the back yoke 24 during the press-fitting operation is reduced.

Referring to FIGS. 2A and 4A, the constitution of the back yoke 24 will be described.

The back yoke 24 is provided with an annular step portion 51 formed on a lower end of the fitting portion 61D in an orthogonal direction to the rotary axis O and a projecting portion 52 that projects downward from the step portion 51.

A lower end surface of the projecting portion 52 is formed as an attachment end surface 61A to which the ring magnet 23 is attached. A cylindrical projection 61B extending around an inner periphery of the ring magnet 23 is formed to project from the attachment end surface 61A of the projecting portion 52. The ring magnet 23 is fixed to the attachment end surface 61A and an outer peripheral surface of the projection 61B by the adhesive 64. Hence, the attachment end surface 61A and the projection 61B function as a joint portion for joining the ring magnet 23 to the back yoke 24.

The attachment end surface 61A and the projection 61B are provided in positions offset downward from the lower end of the fitting portion 61D of the back yoke 24. Accordingly, the ring magnet 23 attached to the back yoke 24 is disposed further downward than the fitting portion 61D.

Referring to FIG. 1, when the back yoke 24 is attached to the input shaft 11, a gap is formed between the projecting portion 52 of the back yoke 24 and the input shaft 11. This annular gap functions as a stress reduction cutout 55 for reducing the shearing stress according to the deformation of the back yoke 24.

Referring to FIG. 2A, functions of the magnetism generating portion 22 having the back yoke 24 that includes the stress reduction cutout 55 will be described.

When the back yoke 24 is press-fitted onto the attachment surface 11A of the input shaft 11, the fitting portion 61D of the back yoke 24 deforms so as to spread out in the radial direction of the input shaft 11. As a result, deformation stress is generated in the back yoke 24, as shown by arrows in FIG. 2A.

In the magnetism generating portion 22, the ring magnet 23 is provided on a lower end surface of the projecting portion 52 formed on the lower end of the fitting portion 61D of the back yoke 24. Since the stress reduction cutout 55 is formed between the projecting portion 52 of the back yoke 24 and the input shaft 11, the deformation stress generated as a diameter of the fitting portion 61D of the back yoke 24 increases is less likely to propagate to the attachment end surface 61A and the projection 61B of the back yoke 24. By disposing the stress reduction cutout 55 between the fitting portion 61D of the back yoke 24 and the attachment end surface 61A and projection 61B in this manner, the shearing stress generated on the adhesion interface between the back yoke 24 and the ring magnet 23 is reduced. As a result, deterioration of the adhesive 64 on the attachment end surface 61A and the outer peripheral surface of the projection 61B can be suppressed.

As shown in FIG. 1, the input shaft 11 is formed with relief grooves 11B, 11C cut in an annular shape in an upper portion and a lower portion of the attachment surface 11A to which the back yoke 24 is press-fitted. When the back yoke 24 is fixed to the input shaft 11 via the fitting portion 61D, an upper end portion and a lower end portion of the fitting portion 61D face the relief grooves 11B, 11C, respectively, and therefore the upper end portion and the lower end portion of the fitting portion 61D do not come into contact with the outer peripheral surface of the input shaft 11. Therefore, spreading of the upper end portion and the lower end portion of the fitting portion 61D of the back yoke 24 in the radial direction of the input shaft 11 can be suppressed when the back yoke 24 is press-fitted to the input shaft 11. As a result, the shearing stress generated on the adhesion interface between the back yoke 24 and the ring magnet 23 can be reduced even further.

Incidentally, the power steering device 1 shown in FIG. 1 is installed in the engine room of a vehicle and is therefore used under a high temperature environment. For this reason, the ring magnet 23 undergoes thermal expansion in the rotary axis O direction, i.e. a polarizing direction. A shearing stress caused in a thermal expansion difference between the ring magnet 23 and the back yoke 24 is generated on the adhesion interface of the ring magnet 23. In case that the ring magnet 23 is made of neodymium, the ring magnet 23 is particularly easily to undergo thermal expansion. Hence, the shearing stress generated on the adhesion interface of the ring magnet 23 increases.

When an aged deterioration of the adhesive 64 advances, the shearing stress cause the adhesive 64 fixing the ring magnet 23 to the back yoke 24 to peel away, and as a result, the ring magnet 23 may fall off the back yoke 24. When the ring magnet 23 falls off, a position in which the ring magnet 23 is fixed to the back yoke 24 shifts in the rotation direction of the input shaft 11, causing an error in the output of the torque sensor 2.

Therefore, the torque sensor 2 includes rotation stopping means for preventing the ring magnet 23 from rotating relative to the back yoke 24 when the ring magnet 23 falls off. The rotation stopping means performs a failsafe function to ensure that the ring magnet 23 does not shift in the rotation direction.

Referring to FIGS. 1, 2A, 4A and 4B, the rotation stopping means of the ring magnet 23 will be described.

As noted above, the adhesive 64 is applied between the back yoke 24 and the ring magnet 23 and then hardened. Hence, the adhesive 64 is formed in a ring shape between the back yoke 24 and the ring magnet 23.

Referring to FIGS. 4A and 4B, the back yoke 24 is provided with four rotation stopping recesses 61C. The rotation stopping recesses 61C are holes opened in the attachment end surface 61A. The rotation stopping recesses 61C are disposed at equal intervals of 90° about the rotary axis O of the torsion bar 21.

The rotation stopping recess 61C is formed as a hole having a circular cross-section that extends parallel to the rotary axis O. The rotation stopping recess 61C has a predetermined depth L1. It should be noted that the rotation stopping recess 61C is not limited to this shape and may take the form of a groove.

Referring to FIG. 2A, the adhesive 64 formed in a ring shape includes projecting portions 64C that are inserted into the rotation stopping recesses 61C. Whereas the rotation stopping recess 61C is formed as a hole, the projecting portion 64C is formed as a projection by the adhesive 64 filled into the rotation stopping recess 61C. Four projecting portions 64C are formed in accordance with the rotation stopping recesses 61C. The projecting portion 64C is formed in a columnar shape and has a predetermined projection amount L1.

Referring to FIG. 1, an air gap 72 is defined between the lower end surface of the ring magnet 23 and the first and second magnetic path tip end portions 26A, 27A of the first and second soft magnetic rings 26, 27. The air gap 72 has a clearance of L2 in the rotary axis O direction. The clearance L2 is set to be smaller than the depth L1 of the rotation stopping recess 61C formed in the back yoke 24.

The adhesive 64 is set to exhibit a greater adhesive force relative to the ring magnet 23 than to the back yoke 24. For example, when the adhesive 64 is an epoxy-based adhesive, the adhesive force between the adhesive 64 and the ring magnet 23 can be increased by subjecting the ring magnet 23 to surface treatment using an epoxy-based resin. Hence, when the adhesive force of the adhesive 64 decreases due to the aged deterioration or the like, an adhesion portion of the adhesive 64 relative to the back yoke 24 peels away before an adhesion portion relative to the ring magnet 23 peels away. Therefore, the hardened adhesive 64 falls off the back yoke 24 together with the ring magnet 23.

When the adhesion portion between the adhesive 64 and the back yoke 24 peels away due to a thermal shock, the aged deterioration, and so on such that the ring magnet 23 falls off the back yoke 24, the ring magnet 23 drops on the first magnetic path tip end portions 26A of the the first soft magnetic ring 26 and the second magnetic path tip end portions 27A of the second soft magnetic ring 27. Accordingly, further displacement of the ring magnet 23 in the axial direction is restricted. When the ring magnet 23 falls off, the projecting portions 64C of the adhesive 64 drop out of the rotation-stopping recesses 61C of the back yoke 24 by an amount corresponding to the clearance L2. However, the projecting portions 64C do not drop out of the rotation-stopping recesses 61C completely, and therefore tip end portions of the projecting portions 64C remain engaged with the rotation-stopping recesses 61C.

When the ring magnet 23 falls off, the rotation-stopping recesses 61C of the back yoke 24 and the projecting portions 64C of the adhesive 64 inserted into the rotation-stopping recesses 61C function as a rotation stopper that latches rotation of the ring magnet 23 relative to the back yoke 24.

When the steering wheel is operated in a state where the ring magnet 23 has fallen off, the ring magnet 23 rotates together with the input shaft 11 via the projecting portions 64C of the adhesive 64 engaged with the rotation-stopping recesses 61C of the back yoke 24. At this time, the ring magnet 23 is slided on the first magnetic path tip end portions 26A and the second magnetic path tip end portions 27A.

Hence, when the ring magnet 23 contacts the first magnetic path tip end portions 26A and the second magnetic path tip end portions 27A, the output signal from the magnetic sensor 48 increases in comparison with a normal state in which the ring magnet 23 has not fallen off. In accordance with the increase in the output signal from the magnetic sensor 48, the steering assist torque of the power steering device 1 increases. Further, the position of the ring magnet 23 to the back yoke 24 does not shift in the rotation direction of the input shaft 11, and therefore a mid-point output of the magnetic sensor 48 does not substantially deviate from that of the normal state. Hence, in the power steering device 1, a difference in the steering assist torque between right and left turns do not occur. The driver can detect an abnormality of the power steering device 1 on the basis of a slight variation of the steering assist torque.

In a state where the rotation of the ring magnet 23 is latched by the projecting portions 64C of the adhesive 64, a force required to shear the projecting portions 64C engaged with the rotation-stopping recesses 61C is set to be larger than a frictional force generated between the ring magnet 23 and the first magnetic path tip end portions 26A and second magnetic path tip end portions 27A. Further, to reduce the frictional force between the ring magnet 23 and the first and second magnetic path tip end portions 26A, 27A, a lubricant may be applied between the ring magnet 23 and the first and second magnetic path tip end portions 26A, 27A.

Figure 6A:
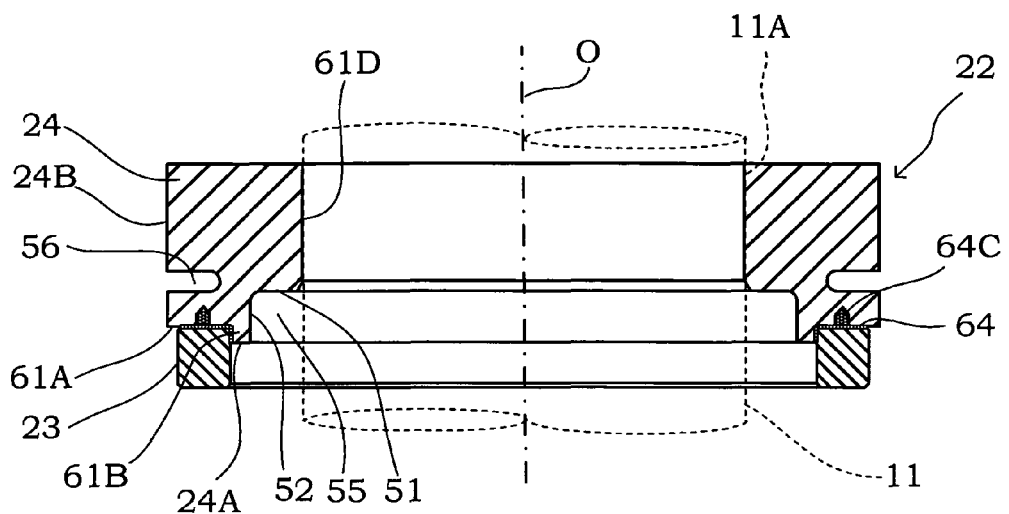
FIGS. 6A and 6B are a longitudinal sectional view and a lower surface view of a magnetism generating portion according to a second embodiment of this invention.
Figure 6B:
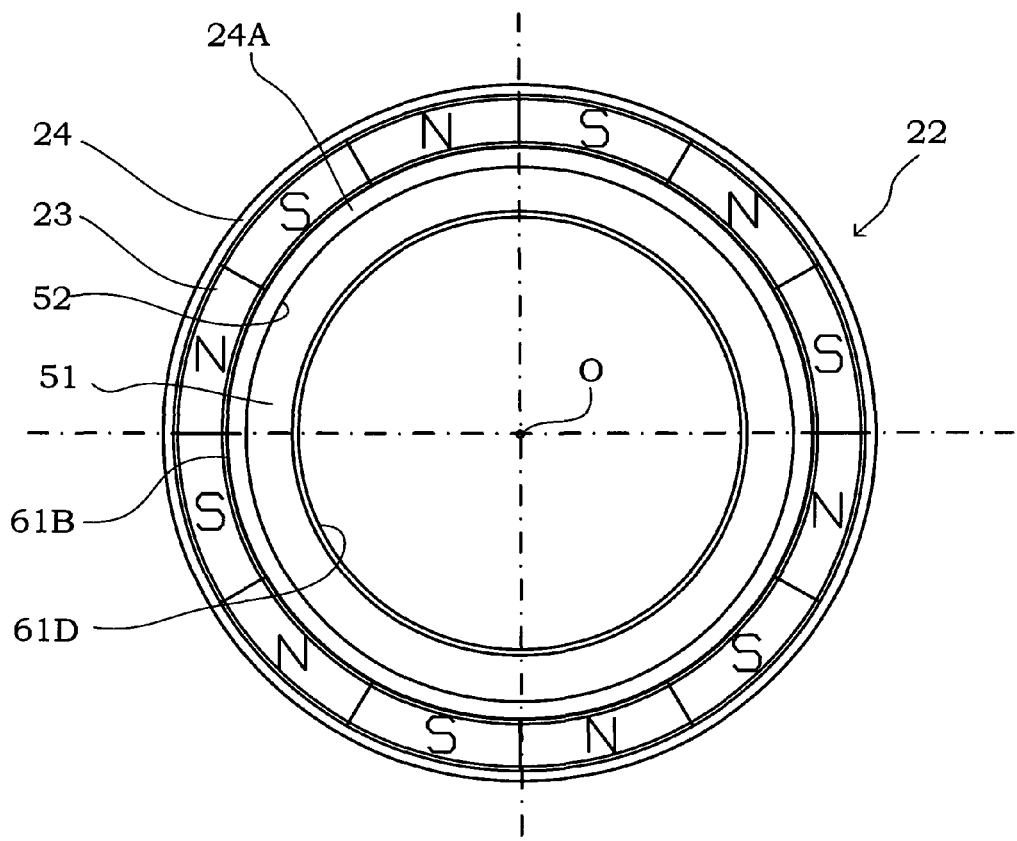

Referring to FIGS. 6A and 6B, a magnetism generating portion 22 according to a second embodiment of this invention will be described.

The magnetism generating portion 22 according to the second embodiment is constructed substantially identically to the magnetism generating portion of the first embodiment but differs therefrom in the construction of the back yoke 24.

The magnetism generating portion 22 is constituted by the back yoke 24 and the ring magnet 23. The back yoke 24 includes the stress reduction cutout 55 constituted by an annular gap formed around the input shaft 11 and a stress reduction cutout 56 constituted by an annular groove opened in an outer peripheral surface 24B of the back yoke 24.

The stress reduction cutout 56 is provided adjacent to the step portion 51 on the lower end of the fitting portion 61D of the back yoke 24.

When the back yoke 24 is press-fitted to the attachment surface 11A of the input shaft 11 via the fitting portion 61D, the fitting portion 61D deforms so as to spread out in the radial direction of the input shaft 11. As a result, deformation stress is generated in the back yoke 24, as shown by the arrows in FIG. 2A.

The deformation stress generated in the back yoke 24 is alleviated by the stress reduction cutout 55, and therefore the shearing stress generated on the adhesion interface between the ring magnet 23 and the back yoke 24 is reduced.

Further, the stress reduction cutout 56 of the back yoke 24 is formed in a position between the fitting portion 61D and the attachment end surface 61A and the outer peripheral surface of the projection 61B, and therefore the aforementioned deformation stress is also alleviated by the stress reduction cutout 56. The deformation stress is hard to propagate to the attachment end surface 61A and the projection 61B of the back yoke 24.

Hence, the shearing stress generated on the adhesion interface between the ring magnet 23 and the back yoke 24 can be reduced further than in the first embodiment, and therefore an effect of suppressing deterioration of the adhesive 64 on the attachment end surface 61A and the outer peripheral surface of the projection 61B can be enhanced. As a result, it is possible to prevent the ring magnet 23 from falling off and avoid shifting the position in which the ring magnet 23 is fixed to the back yoke 24.

Figure 7:
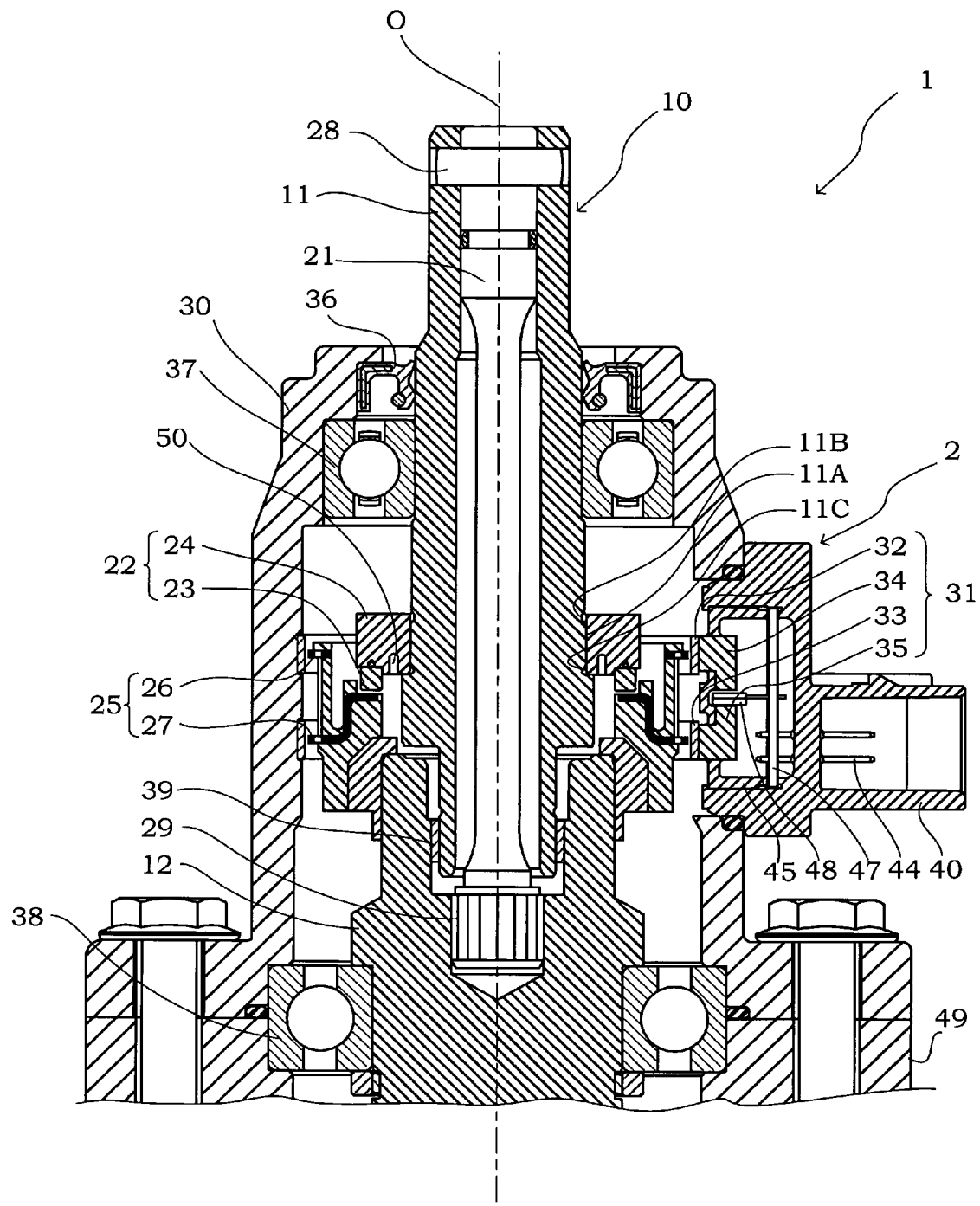
FIG. 7 is a longitudinal sectional view of a power steering device according to a third embodiment of this invention.
Figure 8A:
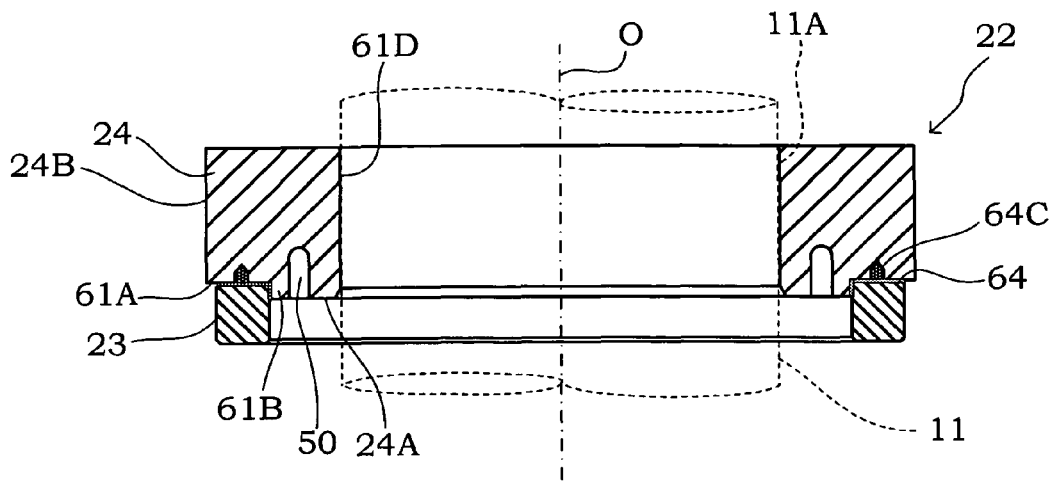
FIGS. 8A and 8B are a longitudinal sectional view and a lower surface view of a magnetism generating portion according to the third embodiment of this invention.
Figure 8B:
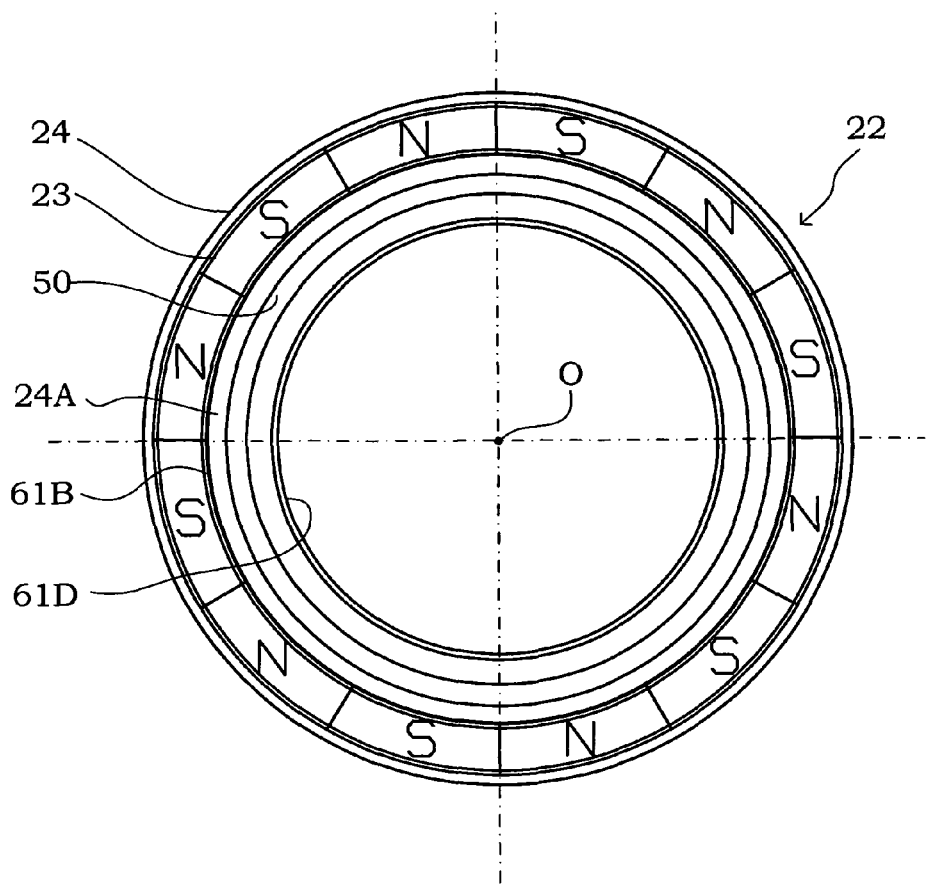

Referring to FIGS. 7, 8A and 8B, a magnetism generating portion 22 according to a third embodiment of this invention will be described.

The magnetism generating portion 22 according to the third embodiment is constructed substantially identically to the magnetism generating portion of the first embodiment but differs therefrom in the construction of the back yoke 24.

The back yoke 24 of the magnetism generating portion 22 according to the third embodiment differs from the first embodiment in that the step portion 51, the projecting portion 52, and the stress reduction cutout 55 are not provided. The ring magnet 23 is fixed to the attachment end surface 61A and the outer peripheral surface of the projection 61B formed on a lower end surface 24A of the back yoke 24. The lower end surface 24A of the back yoke 24 extends in the radial direction of the input shaft 11.

The back yoke 24 includes a stress reduction cutout 50 formed on the lower end surface 24A of the back yoke (24) in an inner side of the ring magnet (23). The stress reduction cutout 50 is an annular groove opened in the lower end surface 24A of the back yoke 24. The stress reduction cutout 50 is formed in a ring shape centering on the rotary axis O.

In the back yoke 24, the fitting portion 61D, the stress reduction cutout 50, the projection 61B, and the attachment end surface 61A are arranged in that order from a center of the back yoke 24 to an outer side. In other words, the stress reduction cutout 50 is formed in a position between the fitting portion 61D and the attachment end surface 61A and the projection 61B.

When the back yoke 24 is press-fitted to the attachment surface 11A of the input shaft 11 via the fitting portion 61D, the fitting portion 61D deforms so as to spread out in the radial direction of the input shaft 11. As a result, deformation stress is generated in the back yoke 24. The deformation stress generated in the back yoke 24 is alleviated by the stress reduction cutout 50. The deformation stress is hard to propagate to the attachment end surface 61A and the projection 61B of the back yoke 24.

Hence, the shearing stress generated on the adhesion interface between the ring magnet 23 and the back yoke 24 can be reduced similarly to the first embodiment, whereby deterioration of the adhesive 64 on the outer peripheral surfaces of the attachment end surface 61A and the projection 61B can be suppressed. As a result, it is possible to prevent the ring magnet 23 from falling off and avoid shifting the position in which the ring magnet 23 is fixed to the back yoke 24.

The contents of JP2010-3953, with a filing date of Jan. 12, 2010 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

In the back yoke 24 according to the first embodiment, a stress reduction cutout as an annular groove may be formed in the step portion 51, similarly to the third embodiment. In this case, the deformation stress generated in the back yoke 24 during press-fitting is alleviated not only by the stress reduction cutout 55 but also by the stress reduction cutout formed in the step portion 51, and is therefore hard to propagate to the attachment end surface 61A and the projection 61B of the back yoke 24. As a result, the shearing stress generated on the adhesion interface between the ring magnet 23 and the back yoke 24 can be reduced in comparison with the first embodiment.

Further, in the back yoke 24 according to the second embodiment, a stress reduction cutout as an annular groove may be formed in the step portion 51, similarly to the third embodiment. In this case, the deformation stress generated in the back yoke 24 during press-fitting is alleviated not only by the stress reduction cutout 55 and the stress reduction cutout 56 but also by the stress reduction cutout formed in the step portion 51, and is therefore hard to propagate to the attachment end surface 61A and the projection 61B of the back yoke 24. As a result, the shearing stress generated on the adhesion interface between the ring magnet 23 and the back yoke 24 can be reduced in comparison with the second embodiment.

Furthermore, in the back yoke 24 according to the third embodiment, a stress reduction cutout as an annular groove may be formed on the outer peripheral surface 24B, similarly to the second embodiment. In this case, the deformation stress generated in the back yoke 24 during press-fitting is alleviated not only by the stress reduction cutout 50 but also by the stress reduction cutout formed on the outer peripheral surface 24B, and is therefore hard to propagate to the attachment end surface 61A and the projection 61B of the back yoke 24. As a result, the shearing stress generated on the adhesion interface between the ring magnet 23 and the back yoke 24 can be reduced in comparison with the third embodiment.

Moreover, in the torque sensor 2 according to the first-third embodiments, the deformation stress generated in the fitting portion 61D of the back yoke 24 may be reduced by forming a serration on the attachment surface 11A of the input shaft 11.

The embodiments of this invention in which an exclusive property or privilege are claimed are defined as follows:

What is claimed is:

1. A torque sensor that comprises a torsion bar that transmits a torque between a first shaft and a second shaft disposed coaxially, a magnetism generating portion fixed to the first shaft, and a rotating magnetic circuit portion fixed to the second shaft and detects a torque acting on the torsion bar based on a magnetic flux density led to the rotating magnetic circuit portion from the magnetism generating portion;

the magnetism generating portion comprising:
a back yoke that is fitted onto the first shaft; and
a ring magnet that is joined to an end surface of the back yoke; and the back yoke comprising:
a fitting portion that is fitted onto the first shaft;
a projecting portion that projects from an end portion of the fitting portion in an axial direction of the first shaft;
a joint portion to which the ring magnet is joined and that is formed on the projecting portion in a position offset from the fitting portion in the axial direction of the first shaft; and
a stress reduction cutout that is a gap defined between the projecting portion and the first shaft and that is configured to suppress a transmission of a deformation stress generated in a radial direction of the fitting portion to the joint portion.

2. The torque sensor as defined in claim 1, wherein the back yoke further comprises a stress reduction portion that is a groove formed on an outer peripheral surface of the back yoke.

3. The torque sensor as defined in claim 1, wherein the back yoke further comprises:
an annular step portion that is formed on the end portion of the fitting portion between the projecting portion and the first shaft; and
a stress reduction portion that is a groove formed on the annular step portion.

4. The torque sensor as defined in claim 1, wherein the stress reduction cutout is formed in an annular shape centering on an axis of the first shaft.

* * * * *